(12) United States Patent
Guemmer

(10) Patent No.: US 8,534,997 B2
(45) Date of Patent: Sep. 17, 2013

(54) FLUID FLOW MACHINE WITH A BLADE ROW GROUP FEATURING A MERIDIONAL EDGE DISTANCE

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 763 days.

(21) Appl. No.: 12/771,596

(22) Filed: Apr. 30, 2010

(65) Prior Publication Data

US 2010/0303629 A1    Dec. 2, 2010

(30) Foreign Application Priority Data

May 28, 2009    (DE) .................. 10 2009 023 100

(51) Int. Cl.
*F01D 5/14* (2006.01)

(52) U.S. Cl.
USPC ..... 415/181; 415/193; 415/199.4; 415/199.5; 416/198 R; 416/198 A; 416/200 R

(58) Field of Classification Search
USPC .......... 415/181, 191, 193, 194, 198.1, 199.4, 415/199.5; 416/198 R, 200 R, 198 A
See application file for complete search history.

(56) References Cited

U.S. PATENT DOCUMENTS

| | | | |
|---|---|---|---|
| 3,937,592 A | | 2/1976 | Bammert |
| 4,859,145 A | * | 8/1989 | Sidransky .................. 415/211.1 |
| 6,350,103 B1 | | 2/2002 | Hashimoto |

FOREIGN PATENT DOCUMENTS

| | | |
|---|---|---|
| DE | 3924829 | 2/1991 |
| DE | 69914823 | 12/2004 |
| DE | 102007035726 | 2/2009 |
| GB | 2235734 | 3/1991 |

OTHER PUBLICATIONS

German Search Report dated Jun. 16, 2010.

* cited by examiner

*Primary Examiner* — Igor Kershteyn
(74) *Attorney, Agent, or Firm* — Timothy J. Klima; Shuttleworth & Ingersoll, PLC

(57) ABSTRACT

A main flow path of a fluid flow machine includes N adjacent member blade rows firmly arranged relative to each other in both a meridional direction m and a circumferential direction u. A number of the member blade rows, N, is greater than/equal to 2 and (i) designates a running index with values between 1 and N. A trailing edge HK (i) of a blade of the member blade row (i) is spaced from a leading edge VK(i+1) of a blade of the adjacent, downstream member blade row (i+1) by a meridional edge distance D in a meridional plane established by axial direction x and radial direction r. A value of D along a height of the main flow path increases towards the main flow path confinement at least along a part of the area between the main flow path center and the main flow path confinement.

19 Claims, 10 Drawing Sheets

FLUID FLOW MACHINE WITH A BLADE ROW GROUP FEATURING A MERIDIONAL EDGE DISTANCE

Figure 1:
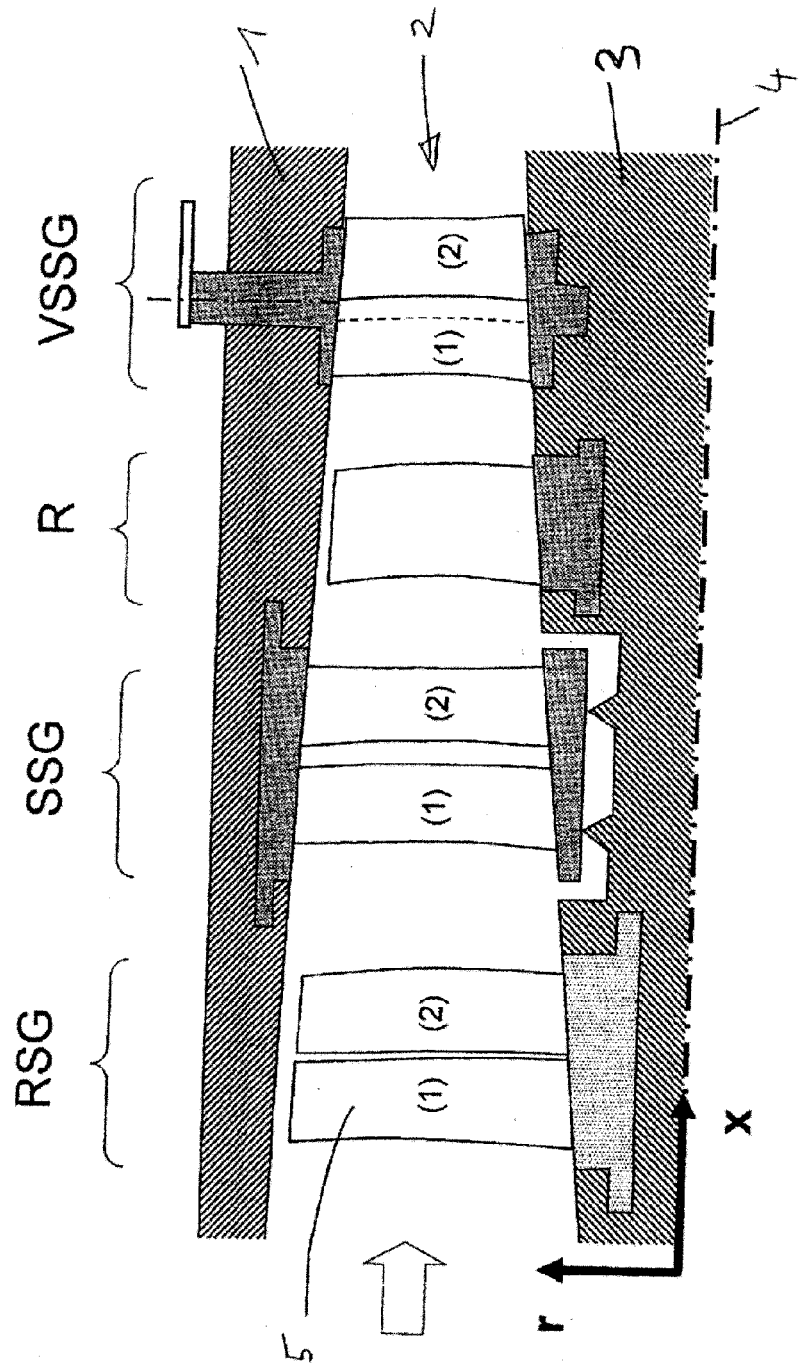

This application claims priority to German Patent Application DE102009023100.5 filed May 28, 2009, the entirety of which is incorporated by reference herein.

The aerodynamic loadability and the efficiency of fluid flow machines, in particular blowers, compressors, pumps and fans, is limited by the growth and the separation of boundary layers near and on the hub and casing walls. To remedy this problem in the case of high aerodynamic loading and important boundary layer growth on the annulus duct side walls (hub or casing), the state of the art provides solutions only to a limited extent.

State of the art in fluid flow machines are arrangements with double-row stators, usually employed as exit stators in compressors, or also double-row rotor arrangements in which directly adjacent rotors operate counter-rotatingly, or in which two directly adjacent rotor blade rows are attached to a common drum. With these arrangements, and in particular with those having several, directly adjacent blade rows firmly arranged relative to each other (for example several rotor blade rows on the same drum, or several stator vane rows), severe boundary layer separation occurs at higher aerodynamic loading in the boundary zone of the main flow path, i.e. at the hub or casing contour.

This is primarily due to the fact that the favorable relative arrangement of two adjacent blade edges of a blade row group in the center of the main flow path has a substantially unfavorable effect in the vicinity of the flow path confinement.

The required flow deflection may quickly be so high either in parts of the blade height or along the entire blade height that this conventional arrangement leads to premature separation of the boundary layer flow in the boundary area on the hub and/or the casing walls.

The present invention relates to blades of fluid flow machines, such as blowers, compressors, pumps, fans and turbines of the axial, semi-axial and radial type using gaseous or liquid working medium. The fluid flow machine may include one or several stages, each stage having a rotor and a stator, in individual cases, the stage is formed by a rotor only.

The rotor includes a number of blades or several adjacent blade rows forming a group, which are connected to the rotating shaft of the machine and impart energy to the working medium. The rotor may be provided with a shroud or a running gap at the outward blade end. The stator includes a number of stationary vanes or several adjacent vane rows forming a group, which may either feature a fixed or a free vane end with gap on the hub and on the casing side.

Rotor drum and blading are usually enclosed by a casing, in other cases (e.g. aircraft or ship propellers) no such casing exists.

The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from the outside of the annulus duct. In an alternative configuration, multi-stage types of said fluid flow machines may have two counter-rotating shafts, with the direction of rotation of the rotor blade rows alternating between stages. Here, no stators exist between subsequent rotors.

Finally, the fluid flow machine may—alternatively—feature a bypass configuration such that the single-flow annulus duct divides into two concentric annuli behind a certain blade row, with each of these annuli housing at least one further blade row.

Conventional blade rows as shown in FIG. 1 without additional design characteristics for stabilizing the wall boundary layers are unsuitable due to extremely high pressure losses and the failure to attain the desired flow deflection (both caused by strong secondary flow, boundary layer separation and re-flow). The consequence is a generally bad performance of the fluid flow machine in terms of efficiency and stability margin available.

A broad aspect of the present invention is to provide a fluid flow machine of the type specified at the beginning above, while being simply designed and easily and cost-effectively producible, combines optimized flow conditions with high efficiency.

More particularly, the present invention relates to a blade row group which includes at least two adjacent blade rows firmly arranged relative to each other (several jointly rotating rotor blade rows or several stator vane rows) and is arranged in a main flow path of a fluid flow machine, with the trailing edge of at least one member blade row having a meridional distance from its adjacent leading edge of the downstream member blade row which is non-uniform and, at least along a portion of the blade height, increases from the main flow path center line towards the main flow path confinement.

Figure 2:
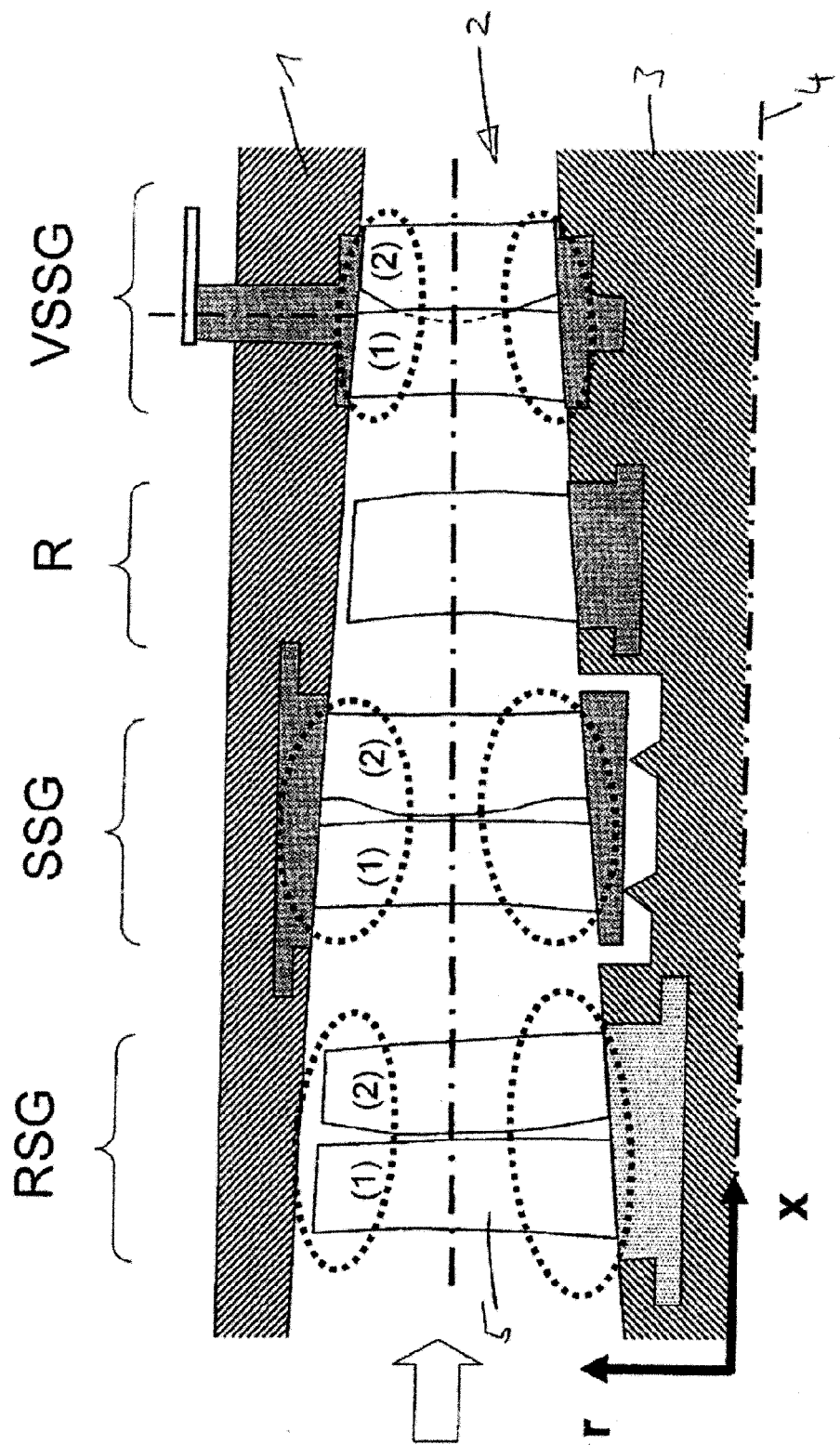
Figure 3:
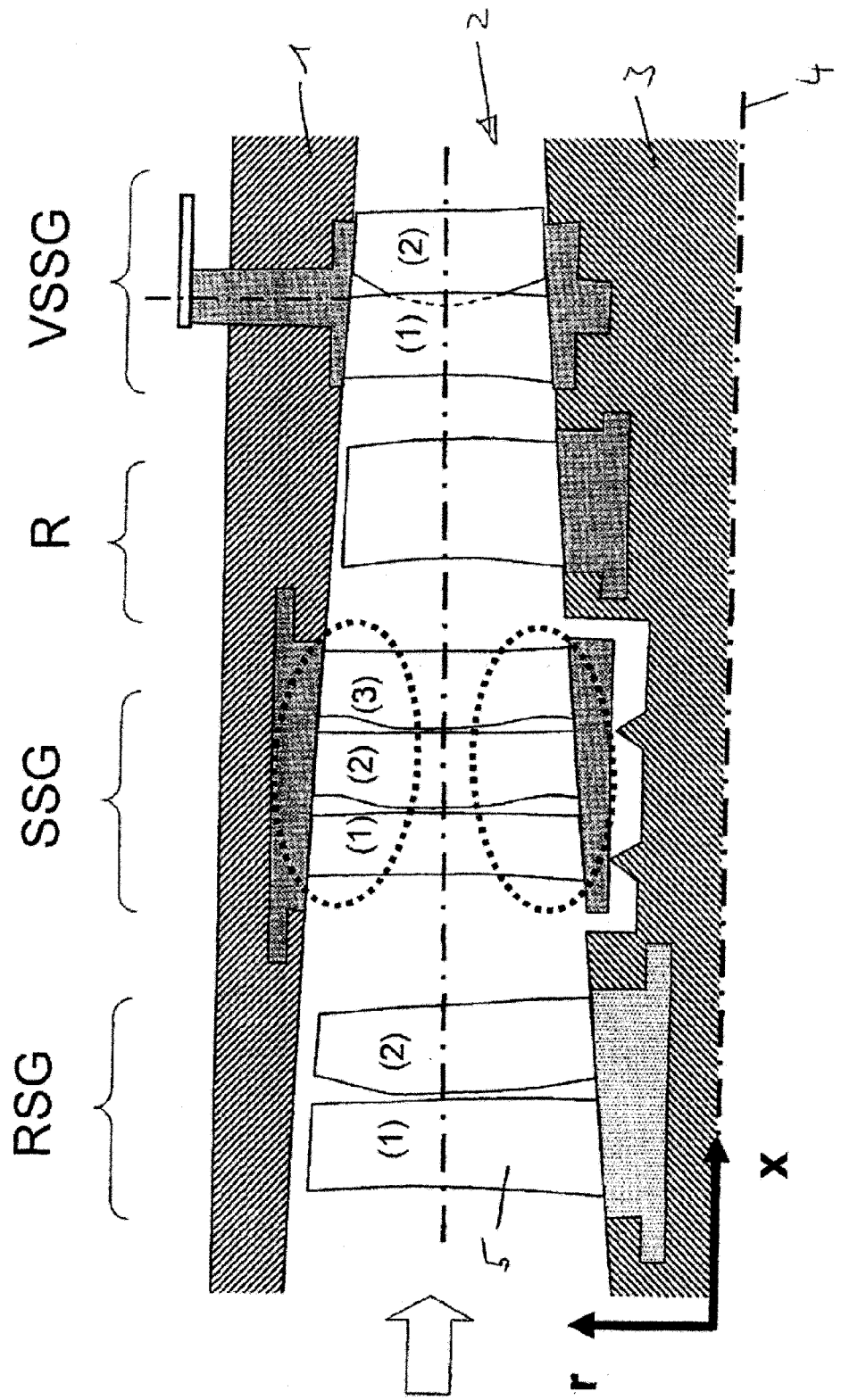
Figure 4:
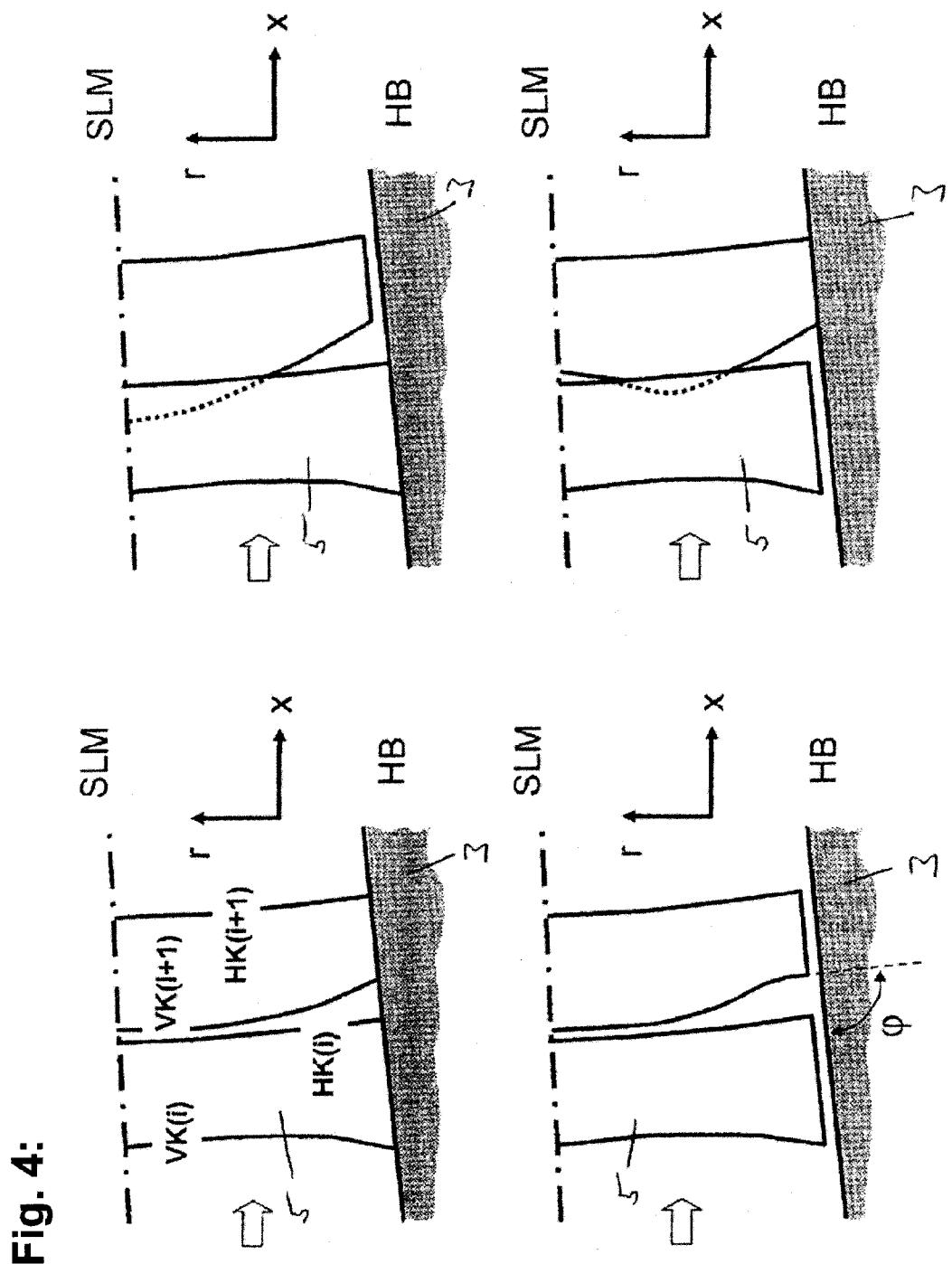
Figure 5:
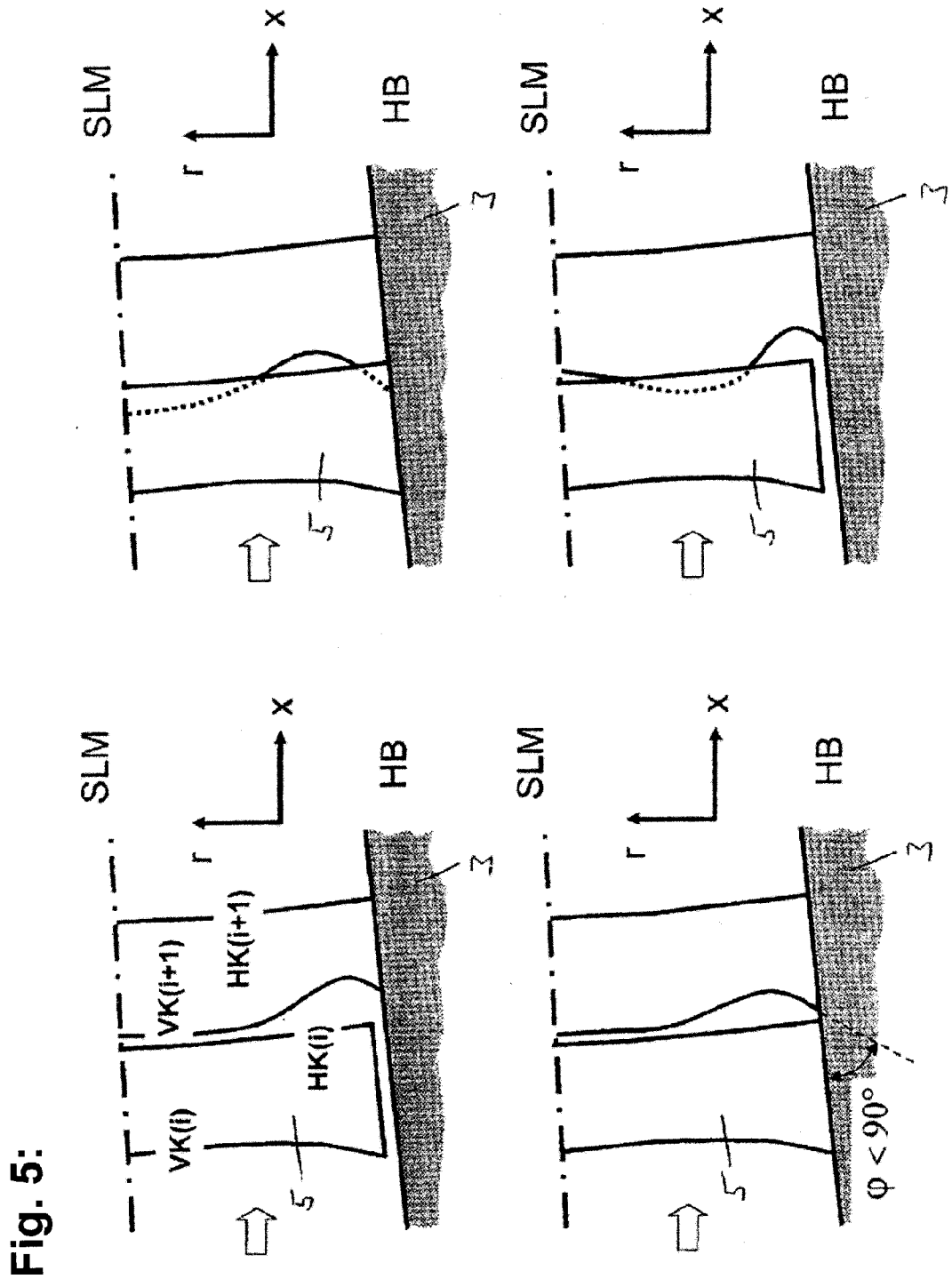
Figure 6:
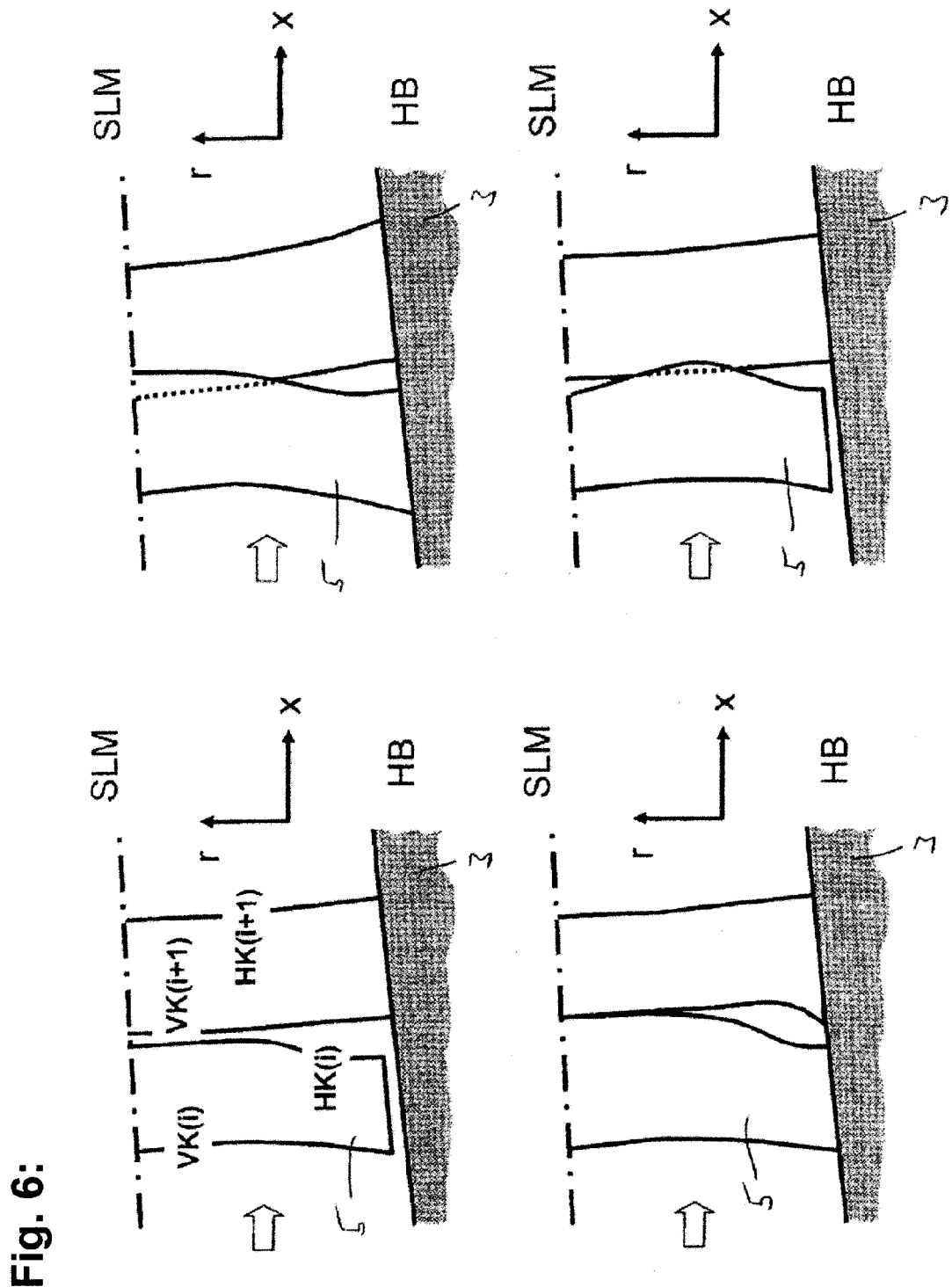
Figure 7:
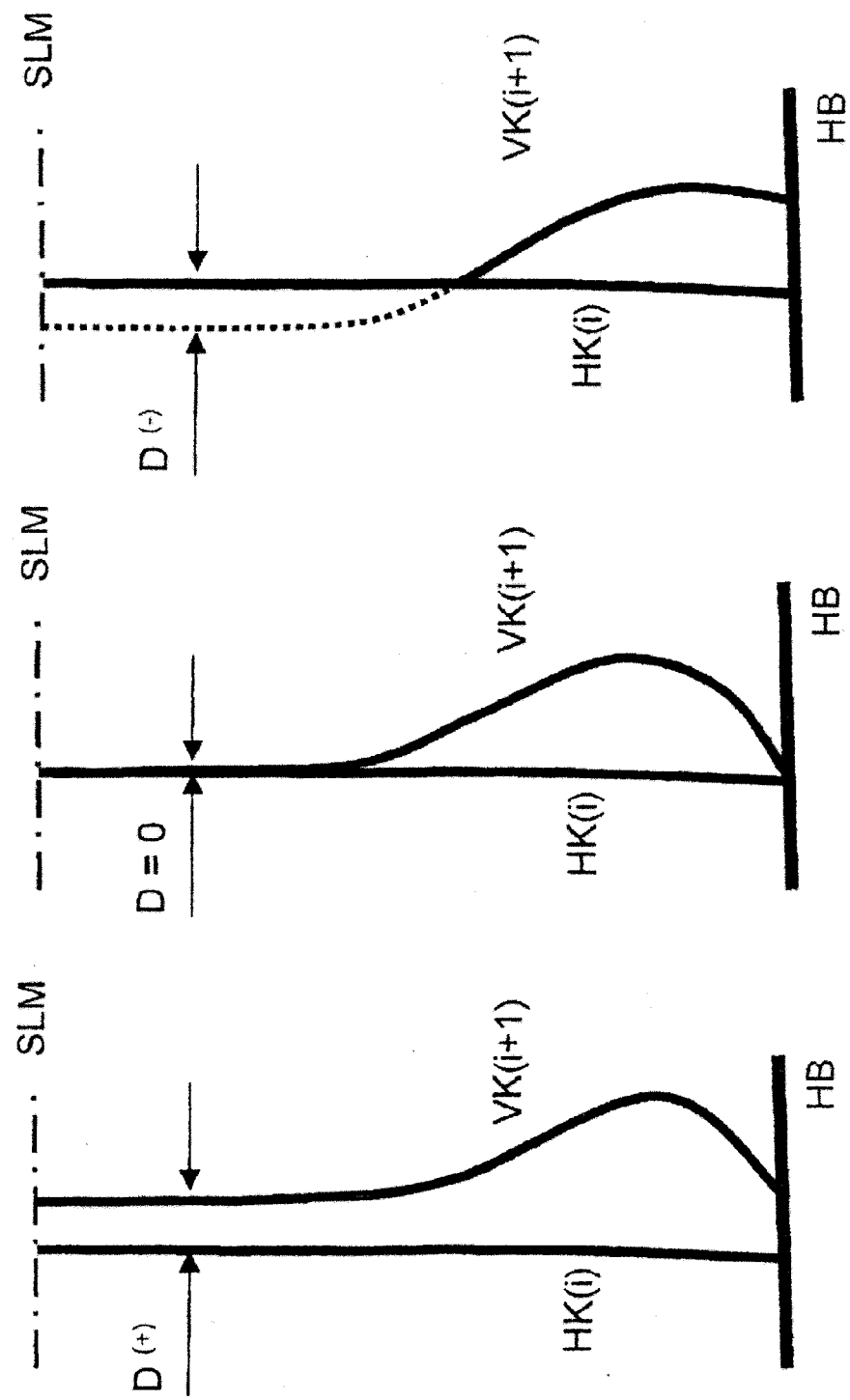
Figure 8:
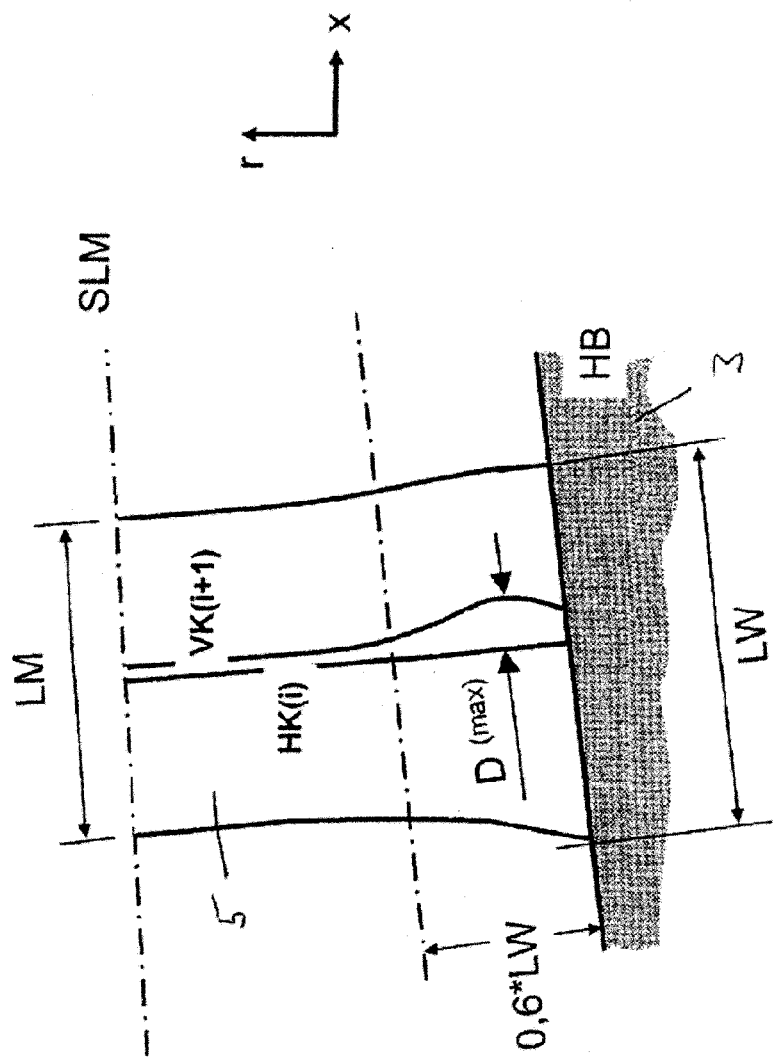
Figure 9:
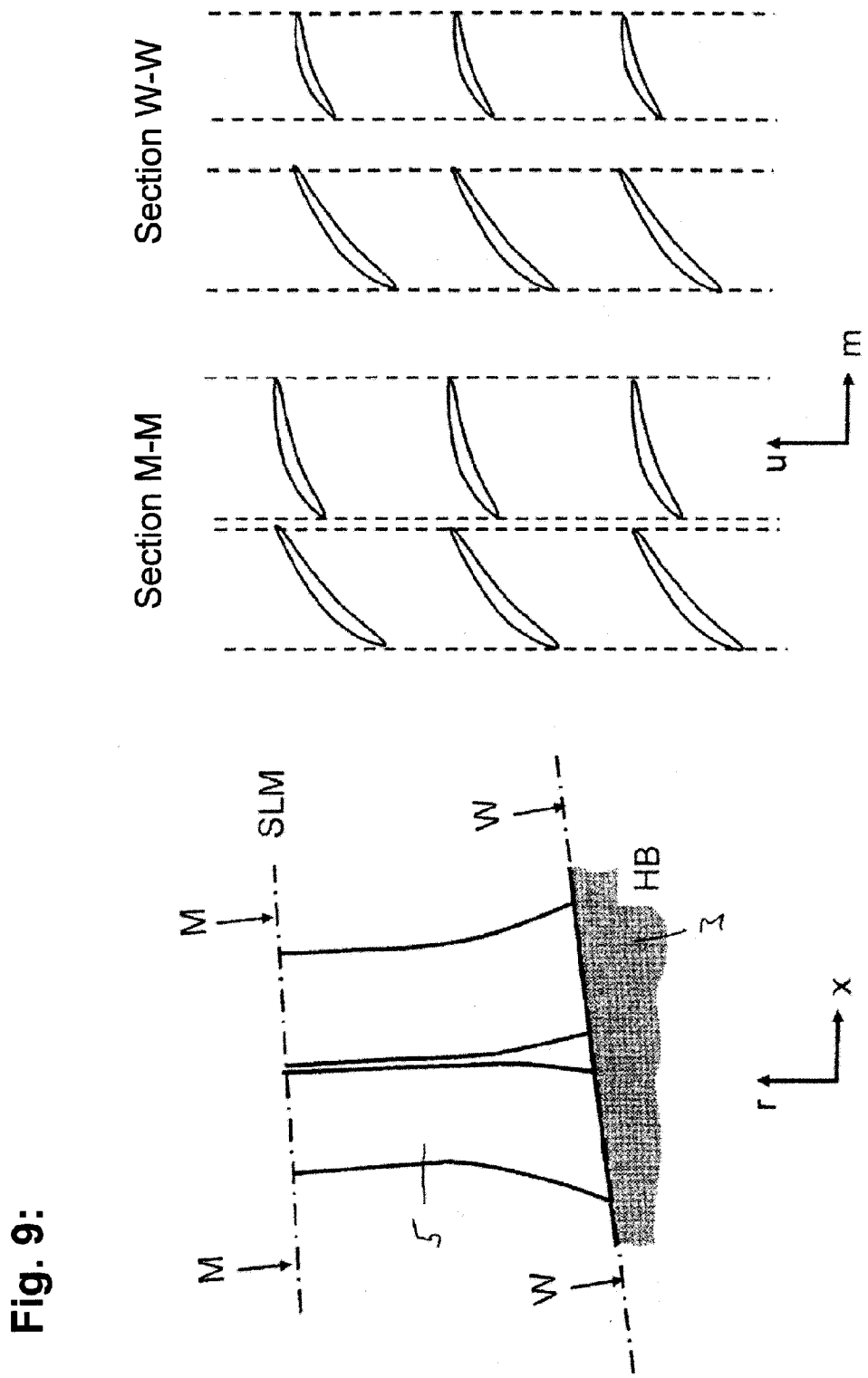
Figure 10:
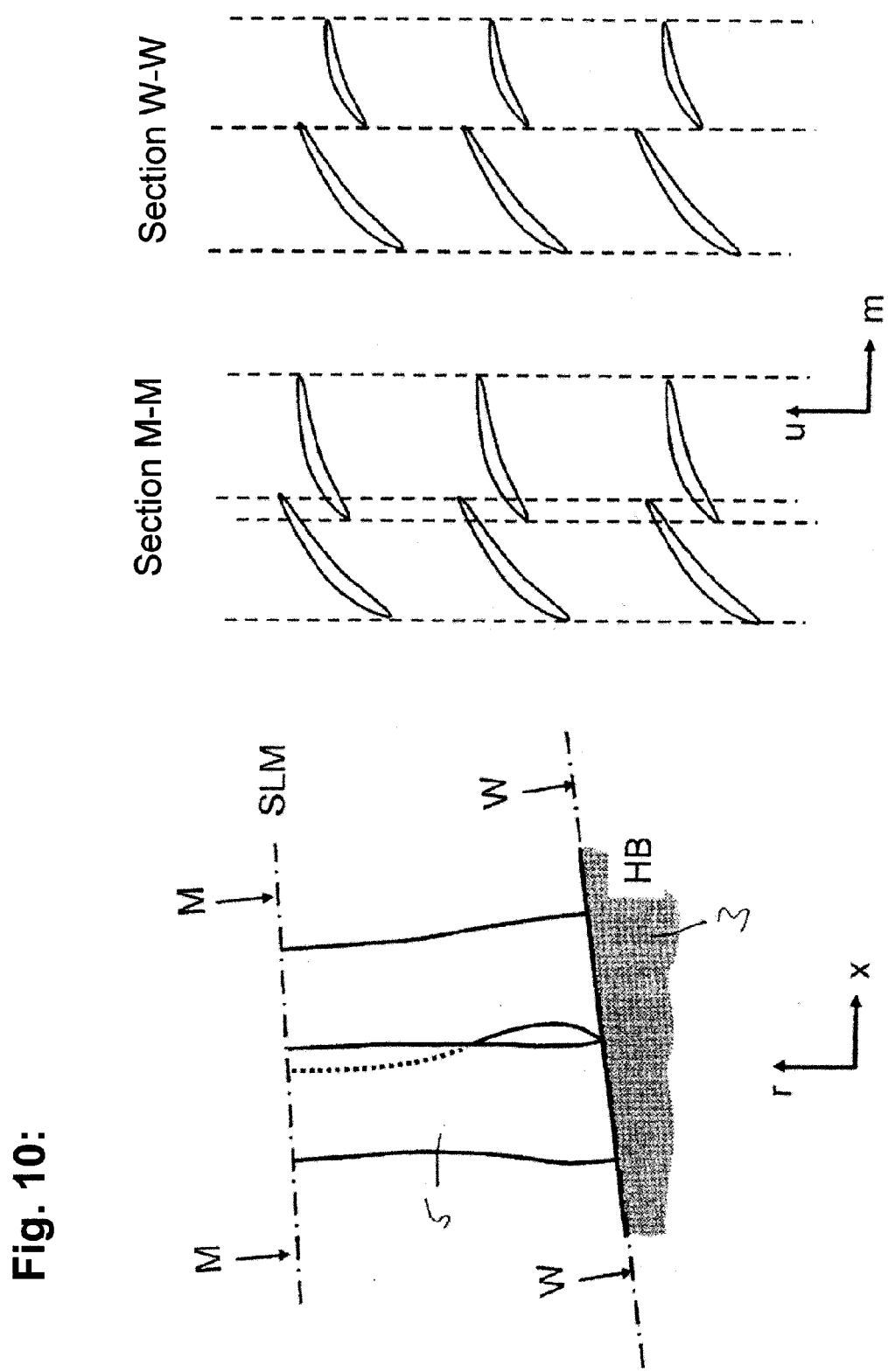

The present invention is more fully described in light of the accompanying figures showing preferred embodiments:

FIG. 1 (Prior Art) shows blade row groups in accordance with the state of the art, FIG. 2 shows blade row groups (survey) in accordance with the present invention, FIG. 3 shows further blade row groups (survey) in accordance with the present invention, FIG. 4 shows inventive arrangements of two member blade rows, FIG. 5 shows further inventive arrangements of two member blade rows, FIG. 6 shows further inventive arrangements of two member blade rows, FIG. 7 shows an inventive definition of the edge distance, FIG. 8 shows the wall-near position of the maximum edge distance in accordance with the present invention, FIG. 9 shows a blade row group in accordance with the present invention (circumferential view), FIG. 10 shows a blade row group in accordance with the present invention (circumferential view).

A conventional blade row group in accordance with the state of the art, as shown in FIG. 1, has constant distances between the blade edges of directly adjacent members of the blade row group.

FIG. 1 shows, in the meridional plane established by the axial direction x and the radial direction r, several blade row groups, with each of the blade row groups including two similar member blade rows showing no variation in their relative arrangement (both circumferentially and meridionally). Accordingly, the rotor blade row group RSG includes two rotor blade rows rotating at the same speed and being connected to each other, with the first member of the group being marked (1) and the second member of the group being marked (2). The stator vane row group SSG includes two directly adjacent fixed stator vane rows. The variable stator vane row group VSSG includes two directly adjacent stator vane rows, with one vane of the forward row and one vane of the rearward row being each provided on a common rotary base and thus jointly settable about the rotary axis.

Common to all state-of-the-art blade row groups is that either the two members of the blade row group are arranged far from one another or the individual members are arranged close to one another and the meridional distance from 'trailing edge member (1)' to 'leading edge member (2)' is essentially uniform. However, the latter configuration, in particular, is very disadvantageous for the flow in the vicinity of the main flow path confinement (hub or casing).

FIG. 2 shows, in the meridional plane established by the axial direction x and the radial direction r, several blade row groups in accordance with the present invention, with each of the blade row groups including two similar member blade rows showing no variation in their relative arrangement. Accordingly, the rotor blade row group RSG according to the present invention includes two rotor blade rows rotating at the same speed and being connected to each other. The stator vane row group SSG according to the present invention includes two directly adjacent fixed stator vane rows. The variable stator vane row group VSSG according to the present invention includes two directly adjacent stator vane rows. A blade of one of the member blade rows together with at least one blade of its immediately downstream member blade row is here arranged on a common rotary base. Alternatively, as not illustrated herein, at least two blades belonging to different member blade rows can also be arranged on an individual rotary base each.

Characteristic for the blade row group according to the present invention is that the existing meridional distance between the trailing edge of at least one blade of a member blade row (i) and the leading edge of at least one blade of the directly adjacent, downstream member blade row (i+1) increases towards the main flow path confinement in at least a part of the area between the center of the main flow path and the boundary of the main flow path. This is schematically exemplified in FIG. 2 in the zones of the rotor blade row group RSG, the stator vane row group SSG and the variable stator vane row group VSSG which are close to the main flow path boundary and will be described in more detail below.

As shown in FIG. 3, a blade row group can, according to the present invention, also have more than two member blade rows, as exemplified here for a number of 3 on the stator vane row group SSG. As not explicitly shown here, a rotor blade row group RSG or a variable stator vane row group can also have more than 2 member blade rows.

According to the present invention, the described configuration of the blade row group includes the possibility that on at least one member blade row the position and/or the profile depth of the blades are circumferentially variable.

It is advantageous if the numbers of blades of two adjacent member blade rows are in an integer ratio to each other, i.e. the number of blades of the member blade row (i) is a multiple of the number of blades of the member blade row (i+1), or the number of blades of the member blade row (i+1) is a multiple of the number of blades of the member blade row (i), or the number of blades of the member blade row (i) equals the number of blades of the member blade row (i+1).

FIG. 4 shows, in the meridional plane established by the axial direction x and the radial direction r, four different arrangements of two adjacent member blade rows (i) and (i+1) belonging to a blade row group according to the present invention. It is understood that the respective blade row group may include even more than the two member blade rows shown each. Shown is the inventive arrangement in the area between the main flow path center (center flow line SLM) and a main flow path confinement HB. The main flow path confinement HB is a contour at the hub or at the casing of the fluid flow machine, for example at a rotary base, a wall, a stator root, a stator shroud, a rotor root or a rotor shroud. The main flow path confinement HB is either firmly connected to the end of at least one member blade row or a gap is provided between the main flow path confinement and at least the end of a member blade row. Each arrangement shows two member blade rows (i) and (i+1), each with a leading edge VK and a trailing edge HK. Crucial according to the present invention is the course of the leading edge VK(i+1) relative to the course of the trailing edge HK(i). It is favorable according to the present invention if, in the main flow path center, the meridional edge distance D (see FIG. 7) is smaller than 5 percent of the always positively signed meridional distance LM between the leading edge VK (i) and the trailing edge HK(i+1), see FIG. 8. All negative values of D, therefore, are also covered by the present invention, corresponding to a position of the leading edge VK(i+1) upstream of the trailing edge HK(i).

The upper left-hand side of FIG. 4 shows two member blade rows which are both firmly connected to the main flow path confinement. Near the flow path center, the leading edge VK(i+1) is arranged at a short, but positive distance D (see FIG. 7) to the trailing edge HK(i). Transversely to the flow, towards the main flow path confinement HB, the meridional edge distance D continually increases in the illustrated examples according to the present invention and assumes its maximum value at the main flow path confinement. It is advantageous according to the present invention if the maximum meridional edge distance D occurring along the main flow path height between the main flow path center and the main flow path confinement exceeds the meridional edge distance D in the main flow path center or at the point of minimum edge distance, respectively, by at least 2% of the meridional distance LM provided between the leading edge VK (i) and the trailing edge HK (i+1) in the main flow path center.

The bottom left-hand side of FIG. 4 shows two member blade rows, each of which having a gap between itself and the main flow path confinement. The leading edge VK (i+1), also here, is arranged near the flow path center at a small distance D downstream of the trailing edge HK(i). The meridional edge distance D continually increases in the direction of the flow path confinement, such that the leading edge VK(i+1) at the main flow path confinement is essentially vertically to the main flow path confinement, corresponding to an inclination angle φ of 87°<φ<=93°.

The upper right-hand side of FIG. 4 shows two member blade rows, of which the one situated further downstream has a gap at the main flow path confinement. The leading edge VK (i+1) is here arranged near the flow path center upstream of the trailing edge HK(i), resulting in a value of the meridional edge distance D of less than 0 at this location. In the direction of the flow path confinement, the meridional edge distance D continually increases, assumes positive values as of a certain position and reaches its maximum value at the main flow path confinement. Also covered by the present invention are arrangements with maximum values of D smaller than zero, if the maximum value of D provided between the center and the edge exceeds the value of D in the main flow path center by at least 2% of the meridional distance LM provided between the leading edge VK (i) and the trailing edge HK(i+1) in the main flow path center. The bottom right-hand side of FIG. 4 shows two member blade rows, of which the one situated further upstream has a gap at the main flow path confinement. The leading edge VK (i+1) is here arranged near the flow path center downstream of the trailing edge HK(i). In a part of the area between the main flow path center and the main flow path confinement, the leading edge VK(i+1) lies upstream of the trailing edge HK(i), corresponding to negative values of D, but returns to positive values of D at the main flow path confinement. Thus, the meridional edge distance D initially decreases towards the main flow path confinement, but then increases again and assumes its maximum value at the main flow path confinement. Characteristic for the solutions according to the present invention shown in FIG. 4 is the essentially approximately straight course of the trailing edge HK(i) in the area between the main flow path center and the main flow path confinement, with the maximum of the meridional edge distance D resulting from a curvilinear course of the leading edge (i+1).

FIG. 5 also shows solutions with an essentially approximately straight course of the trailing edge HK(i). In accordance with this advantageous form of a blade row group according to the present invention, the meridional edge distance D here initially increases towards the main flow path confinement over a part of the main flow path height. A decrease of D is however provided near the main flow path confinement. In the example shown, the essentially straight trailing edge HK(i) results in an S-shaped course of the leading edge VK(i+1) in the area between main flow path center and main flow path confinement. Therefore, the maximum of D lies in the area between the main flow path center and the main flow path confinement. It is particularly favorable according to the present invention to provide the maximum directly at the main flow path confinement or in the area between the main flow path confinement and a limit situated 0.6*LM off the main flow path confinement, see FIG. 8. It is also particularly favorable if the leading edge VK(i+1) in the meridional plane always viewed here has positive sweep along the main flow path height at the main flow path confinement, to produce the course of D in accordance with the present invention, corresponding to an inclination angle φ<90°.

FIG. 6 finally shows solutions with a curved trailing edge HK(i). As per this advantageous form, the course of the meridional edge distance D towards the flow path confinement according to the present invention is obtained with a leading edge VK(i+1) which is essentially approximately straight or swept at the main flow path confinement.

On the left-hand side of FIG. 9, an arrangement according to the present invention is shown in which both edges controlling the meridional edge distance, the trailing edge HK(i) and the leading edge VK(i+1), take a course away from each other, with these two edges (when neglecting their curvature) forming a configuration with the main flow path confinement resembling an isosceles triangle. This occurs in particular if the two edges HK(i) and VK(i+1) are congruent in a part or point of the main flow path interior or VK(i+1) is situated upstream of HK(i) and, therefore, within the bladed space of the member blade row (i). According to the present invention, the illustrated half of the member blade rows then assumes a shape in the area of the blade ends which resembles the bottom of the Eiffel tower.

Particular inventive solutions accordingly show, in a part of the area between the main flow path center and the main flow path confinement, an exit of the leading edge VK(i+1) from the bladed zone of the member blade row (i) towards the main flow path confinement, if applicable in conjunction with an entry of the leading edge VK(i+1) into the bladed zone of the member blade row (i) at a position further inward in the main flow path, see also FIG. 10, left-hand side.

FIG. 9 shows, on the right-hand side, a favorable arrangement according to the present invention of the two member blade rows considered in the plane established by the meridional coordinate m and the circumferential direction u. A corresponding circumferential development is shown for the section M-M in the main flow path center and a section W-W at the main flow path confinement. The two member blade rows have the same number of blades, with, when viewed in the circumferential direction u, a blade of the row (i+1) being always provided closer to a pressure side of a blade of the row (i).

FIG. 10 similarly shows an arrangement according to the present invention with edges HK(i) and VK(i+1) being interpositionally arranged and a maximum of the meridional edge distance D provided in the vicinity of the main flow path confinement.

Beneficial for a stator vane row group according to the present invention is an arrangement in which, when viewed in the main flow direction, a rotor blade row or a rotor blade row group is provided both upstream and downstream of the stator vane row group according to the present invention.

Also beneficial for a rotor blade row group according to the present invention is an arrangement in which, when viewed in the main flow direction, a stator vane row or a stator vane row group is provided both upstream and downstream of the rotor blade row group according to the present invention.

Also favorable is an inventive size relationship between the meridional length LM in the main flow path center and the meridional length LW at the main flow path confinement: LW>LM. It is here particularly favorable if at least one of the member blade rows (i) and (i+1) has its individually maximum meridional length at the main flow path confinement, or if there is an individually lager meridional length at the main flow path confinement than at the main flow path height of the minimum meridional edge distance D.

The present invention provides for a significantly higher aerodynamic loadability of rotors and stators in fluid flow machines, with efficiency being maintained or even improved. A reduction of the number of parts and the weight of the components by more than 20 percent seems to be achievable. Application of the concept to the high-pressure compressor of an aircraft engine with approx. 25,000 lbs thrust leads to a reduction of the specific fuel consumption of up to 0.5 percent.

The present invention can also be described as follows, with the following groups of characteristics, whatever their combination, being essential for the present invention:

Fluid flow machine with a blade row group arranged in a main flow path of a fluid machine and including N adjacent member blade rows firmly arranged relative to each other in both the meridional direction m and the circumferential direction u, with the number of the member blade rows, N, being greater than/equal to 2 and (i) designating the running index with values between 1 and N, with the trailing edge HK (i) of at least one blade of the member blade row (i) being spaced from the leading edge VK(i+1) of at least one blade of the adjacent, downstream member blade row (i+1) by the meridional edge distance D in the meridional plane established by the axial direction x and the radial direction r, with the value of the edge distance D along the height of the main flow path increasing towards the main flow path confinement at least along a part of the area between the main flow path center and the main flow path confinement and assuming a maximum value, with the main flow path confinement being formed by one of the hub and casing contours of the fluid flow machine, i.e. a wall, an abradable coating, a rotary base, a stator root, a stator shroud, a rotor root or a rotor shroud, with preferably;

the maximum value of the edge distance D being larger than the minimum meridional edge distance D occurring in the area between the main flow path center and the main flow path confinement by at least 2% of the meridional distance LM provided between the leading edge VK(i) and the trailing edge HK(i+1) in the main flow path center, with preferably;

the main flow path confinement being firmly connected to the end of at least one member blade row, with preferably;

a gap between the main flow path confinement and at least the end of a member blade row being provided, with preferably;

the number of blades of two adjacent member blade rows being in an integer ratio to each other, such that the number of blades of the member blade row (i) is a multiple of the number of blades of the member blade row (i+1) or the number of blades of the member blade row (i+1) is a multiple of the number of blades of the member blade row (i) or the number of blades of the member blade row (i) equals the number of blades of the member blade row (i+1), with preferably;

in the center of the main flow path, the trailing edge HK(i+1) being provided downstream of the trailing edge HK(i) in the area between the leading edge VK(i) and 5% of the meridional profile depth LM of the member blade row (i), with preferably the maximum value of the meridional edge distance D being provided in the area between a limit situated 0.6*LM off the main flow path confinement and the main flow path confinement itself, with preferably;

the maximum value of the meridional edge distance D being provided as far as possible at the main flow path confinement, i.e. directly at the main flow path confinement in the case of firm blade ends, and directly at the blade end in the case of blade ends with gap, with preferably;

at least one of the blade edges HK(i) and VK(i+1) at the main flow path confinement being aligned essentially vertically to the main flow path confinement, corresponding to an inclination angle $\phi$ of $87°<\phi<93°$ measured between the respective blade edge and the main flow path confinement, with preferably;

the meridional edge distance D at least along a part of the area between the main flow path center and the main flow path confinement continually increasing up to the main flow path confinement and assuming its maximum value there, with preferably;

the maximum value of the meridional edge distance D not being provided at the main flow path confinement and at least one of the blade leading edges VK(i) and VK(i+1) having positive sweep at the main flow path confinement, corresponding to an inclination angle $\phi$ of less than 90° measured between the respective blade edge and the main flow path confinement in the meridional plane, with preferably;

the member blade rows (i) and (i+1) at least partly overlapping each other in the meridional flow direction, so that the leading edge VK(i+1) is provided at least along a part of the area between the main flow path center and the main flow path confinement upstream of the trailing edge HK(i), resulting in local values of the meridional edge distance D of less than 0, with preferably the leading edge VK(i+1) and the trailing edge HK(i), in meridional view, in the area between the main flow path center and the main flow path confinement, forming a point of intersection, in which, when viewed in the direction of the flow path confinement, the sign of the meridional edge distance D changes from negative to positive, with preferably;

in meridional view at least one of the blade edges HK(i) and VK(i+1) showing an S-shaped course in at least a part of the area between the main flow path center and the main flow path confinement, with preferably;

in meridional view at least one of the blade edges HK(i) and VK(i+1) showing an essentially rectilinear course in the area between the main flow path center and the main flow path confinement.

LIST OF REFERENCE NUMERALS

1 Casing
2 Annulus duct/main flow path
3 Rotor drum (hub)
4 Machine axis
5 Blade/blade row

What is claimed is:

1. A fluid flow machine blade row group arrangement, comprising:

a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;

wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;

wherein the maximum value of the meridional edge distance D is provided away from the main flow path confinement and at least one chosen from the blade leading edges VK(i) and VK(i+1) has a positive sweep at the main flow path confinement, corresponding to an inclination angle $\phi$ of less than 90° measured between the respective blade edge and the main flow path confinement in the meridional plane.

2. The fluid flow machine blade row group arrangement of claim 1, wherein the maximum value of the edge distance D is larger than the minimum meridional edge distance D occurring in the area between the main flow path center and the main flow path confinement by at least 2% of a meridional distance LM provided between a leading edge VK(i) of at least one blade of the member blade row (i) and the trailing edge HK(i+1) of at least one blade of the member blade row (i+1) in the main flow path center.

3. The fluid flow machine blade row group arrangement of claim 2, wherein the main flow path confinement is firmly connected to ends of blades of at least one member blade row.

4. The fluid flow machine blade row group arrangement of claim 2, and further comprising a gap between the main flow path confinement and ends of blades of at least one member blade row.

5. The fluid flow machine blade row group arrangement of claim 2, wherein numbers of blades of two adjacent member blade rows are in an integer ratio to each other, such that one of the following occurs: a number of blades of the member blade row (i) is an integer multiple of a number of blades of the member blade row (i+1); the number of blades of the member blade row (i+1) is an integer multiple of the number of blades of the member blade row (i); or the number of blades of the member blade row (i) equals the number of blades of the member blade row (i+1).

6. The fluid flow machine blade row group arrangement of claim 2, wherein, in the center of the main flow path, the meridional edge distance D is smaller than 5% of the always positively signed meridional distance LM between the leading edge VK(i) and trailing edge HK(i+1).

7. The fluid flow machine blade row group arrangement of claim 6, wherein the maximum value of the meridional edge distance D is provided in an area between 1) a limit situated 0.6*LM off the main flow path confinement and 2) the main flow path confinement itself.

8. The fluid flow machine blade row group arrangement of claim 7, wherein the maximum value of the meridional edge distance D is provided as close as possible to the main flow path confinement, that is, directly at the main flow path confinement in a case of fixed blade ends, and directly at blade ends in a case of blade ends having a gap.

9. The fluid flow machine blade row group arrangement of claim 8, wherein at least one chosen from the blade edges HK(i) and VK(i+1) at the main flow path confinement is aligned to an inclination angle φ of 87°<φ<93° measured between the respective blade edge and the main flow path confinement.

10. The fluid flow machine blade row group arrangement of claim 9, wherein the meridional edge distance D at least along a part of the area between the main flow path center and the main flow path confinement continually increases up to the main flow path confinement and assumes its maximum value at the main flow path confinement.

11. The fluid flow machine blade row group arrangement of claim 1, wherein the member blade rows (i) and (i+1) at least partly overlap each other in a meridional flow direction, so that the leading edge VK(i+1) is provided at least along a part of the area between the main flow path center and the main flow path confinement upstream of the trailing edge HK(i), resulting in local values of the meridional edge distance D of less than 0.

12. The fluid flow machine blade row group arrangement of claim 1, wherein the leading edge VK(i+1) and the trailing edge HK(i), in meridional view, in the area between the main flow path center and the main flow path confinement, form a point of intersection, in which, when viewed in a direction of the flow path confinement, a sign of the meridional edge distance D changes from negative to positive.

13. The fluid flow machine blade row group arrangement of claim 1, wherein, in a meridional view, at least one chosen from the blade edges HK(i) and VK(i+1) has an S-shaped course in at least a part of the area between the main flow path center and the main flow path confinement.

14. The fluid flow machine blade row group arrangement of claim 1, wherein, in a meridional view, at least one chosen from the blade edges HK(i) and VK(i+1) has an essentially rectilinear course in the area between the main flow path center and the main flow path confinement.

15. A fluid flow machine blade row group arrangement, comprising:
a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;
wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;
wherein, in a meridional view, at least one chosen from the blade edges HK(i) and VK(i+1) has an S-shaped course in at least a part of the area between the main flow path center and the main flow path confinement.

16. A fluid flow machine blade row group arrangement, comprising:
a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;
wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;
wherein:
near the main flow path center, the leading edge VK(i+1) is downstream of the trailing edge HK(i), in meridional view, such that the meridional edge distance D is positive;
in the area between the main flow path center and the main flow path confinement, the leading edge VK(i+1) lies upstream of the trailing edge HK(i), such that the meridional edge distance D is negative;
at the main flow path confinement, the leading edge VK(i+1) is again downstream of the trailing edge HK(i), such that the meridional edge distance D returns to positive.

17. A fluid flow machine blade row group arrangement, comprising:
a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;
wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;

wherein the maximum value of the meridional edge distance D is positive and provided away from the main flow path confinement, and the blade leading edge VK(i+1) has a positive sweep at the main flow path confinement, corresponding to an inclination angle φ of less than 90° measured between the blade edge and the main flow path confinement in the meridional plane.

18. A fluid flow machine blade row group arrangement, comprising:

a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;

wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;

wherein the trailing edge HK(i) and the leading edge VK(i+1) veer away from one another beginning at a position between the center of the main flow path and the main flow path confinement and continuing to the main flow path confinement with a meridional chord length of at least one chosen from the blade of the blade member row (i) and the blade of the blade member row (i+1) being longest at the main flow path confinement.

19. A fluid flow machine blade row group arrangement, comprising:

a blade row group arranged in a main flow path of a fluid flow machine, the blade row group including a quantity N of adjacent member blade rows firmly arranged relative to each other in both a meridional direction m and a circumferential direction u, with the quantity N of the member blade rows being greater than/equal to 2; a running index having values between 1 and N;

wherein a trailing edge HK(i) of at least one blade of a member blade row (i) is spaced from a leading edge VK(i+1) of at least one blade of an adjacent, downstream member blade row (i+1) by a meridional edge distance D in a meridional plane established by an axial direction x and a radial direction r; wherein a value of the meridional edge distance D along a height of the main flow path increases towards a main flow path confinement at least along a part of an area between a center of the main flow path and the main flow path confinement and assumes a maximum value, with the main flow path confinement being formed by at least one chosen from hub and casing contours of the fluid flow machine;

wherein the trailing edge HK(i) at the main flow path confinement is positioned upstream of a remaining portion of the trailing edge HK(i) between the center of the main flow path and the main flow path confinement and the leading edge VK(i+1) at the main flow path confinement is positioned upstream of a remaining portion of the leading edge VK(i+1) between the center of the main flow path and the main flow path confinement.

\* \* \* \* \*